United States Patent
Pandit et al.

(10) Patent No.: US 8,024,796 B2
(45) Date of Patent: Sep. 20, 2011

(54) SYSTEM AND METHOD FOR STORING EVENTS TO ENHANCE INTRUSION DETECTION

(75) Inventors: Bhalchandra S. Pandit, Redmond, WA (US); Maximilian Aigner, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1289 days.

(21) Appl. No.: 11/275,444

(22) Filed: Jan. 3, 2006

(65) Prior Publication Data

US 2006/0089952 A1  Apr. 27, 2006

Related U.S. Application Data

(63) Continuation of application No. 10/076,039, filed on Feb. 13, 2002, now Pat. No. 7,073,074.

(51) Int. Cl.
*G06F 12/14* (2006.01)
*G06F 12/16* (2006.01)

(52) U.S. Cl. .............................. 726/22; 726/23; 726/25

(58) Field of Classification Search .................. 713/165, 713/167, 185
See application file for complete search history.

(56) References Cited

U.S. PATENT DOCUMENTS

| | | | |
|---|---|---|---|
| 5,027,400 A | 6/1991 | Baji et al. | |
| 5,099,319 A | 3/1992 | Esch et al. | |
| 5,499,046 A | 3/1996 | Schiller et al. | |
| 5,991,881 A * | 11/1999 | Conklin et al. | 726/22 |
| 6,070,244 A | 5/2000 | Orchier et al. | |
| 6,085,191 A | 7/2000 | Fisher et al. | |
| 6,115,680 A * | 9/2000 | Coffee et al. | 702/187 |
| 6,222,530 B1 | 4/2001 | Sequeira | |
| 6,275,957 B1 | 8/2001 | Novik et al. | |
| 6,289,344 B1 | 9/2001 | Braia et al. | |
| 6,295,607 B1 | 9/2001 | Johnson | |
| 6,397,228 B1 * | 5/2002 | Lamburt et al. | 707/692 |
| 6,799,277 B2 * | 9/2004 | Colvin | 726/22 |
| 6,839,852 B1 * | 1/2005 | Pantuso et al. | 726/11 |
| 2002/0019945 A1 * | 2/2002 | Houston et al. | 713/201 |

* cited by examiner

*Primary Examiner* — Benjamin Lanier
(74) *Attorney, Agent, or Firm* — Lee & Hayes, PLLC

(57) ABSTRACT

Storing events to enhance intrusion detection in networks is described. In one exemplary implementation, an event is received. The event includes a data section containing a set of strings each having an event field. A definition table is referenced to determine locations of event fields in the data section of the event. The event fields are stored in a database record corresponding to event field locations referenced from the definition table.

19 Claims, 7 Drawing Sheets

```
Event Type:      Success Audit
Event Source:    Security
Event Category:  Account Management
Event ID: 626
Date:            2/12/2002
Time:            3:38:03 PM
User:            KUMARPDOM\Administrator
Computer: KUMARP7-13
Description:
User Account Enabled:
     Target Account Name:     foo
     Target Domain: KUMARPDOM
     Target Account ID:   KUMARPDOM\foo
     Caller User Name:    Administrator
     Caller Domain: KUMARPDOM
     Caller Logon ID:     (0x0,0x237CE5)
```

*Fig. 1A*

SYSTEM AND METHOD FOR STORING EVENTS TO ENHANCE INTRUSION DETECTION

RELATED APPLICATION

This application is a continuation of, and claims priority to, U.S. patent application Ser. No. 10/076,039, entitled "System and Method for Storing Events to Enhance Intrusion Detection" filed Feb. 13, 2002, to Pandit et al., the disclosure of which is incorporated by reference herein.

TECHNICAL FIELD

This invention relates to intrusion detection, and more particularly, to systems and methods for storing events to enhance intrusion detection in a host based intrusion detection system.

BACKGROUND

Detecting computer hackers, unauthorized computer operations or other abnormal anomalies that can compromise computer networks and/or sensitive data stored therein, is increasingly becoming more difficult. Most systems keep track of potentially security sensitive events that occur on those systems. These are called audit events. The audit events are stored in a secure log referred to as a security event log. In larger server environments, where there may be multiple networks feeding into a central server, it is not unusual to track 500 million audit events in a month or hundreds of audit events per second.

Now, when an intrusion or any type of security irregularity (e.g., a break-in), is suspected in a network, it is necessary to review the event log in an attempt to identify the root cause of the suspected irregularity. Current software intrusion products are often unable to timely search such massive amounts of data and adroitly identify the suspected irregularity. Currently it may take hours or several days to search through the logs to identify the irregularity and take corrective action. Many times queries need to be tested, updated and often a manual review of certain audit events is necessary to identify the root cause of an irregularity. Until the culprit of a security irregularity is identified a network remains vulnerable to continued penetration, potentially causing data or service to be severely compromised.

SUMMARY

A system and method for storing events to enhance intrusion detection is described. In one exemplary implementation, an event is received. The event includes a data section containing a set of strings each having an event field. A definition table is referenced to determine locations of event fields in the data section of the event. The event fields are stored in a database record corresponding to event field locations referenced from the definition table.

BRIEF DESCRIPTION OF THE DRAWINGS

The detailed description is described with reference to the accompanying figures. In the figures, the left-most digit(s) of a reference number identifies the figure in which the reference number first appears.

FIG. 1A illustrates a representative example of a single security sensitive event formatted to make it readable by a human.

DETAILED DESCRIPTION

The following discussion is directed to storing events for enhanced intrusion detection. The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Exemplary System

Figure 1:
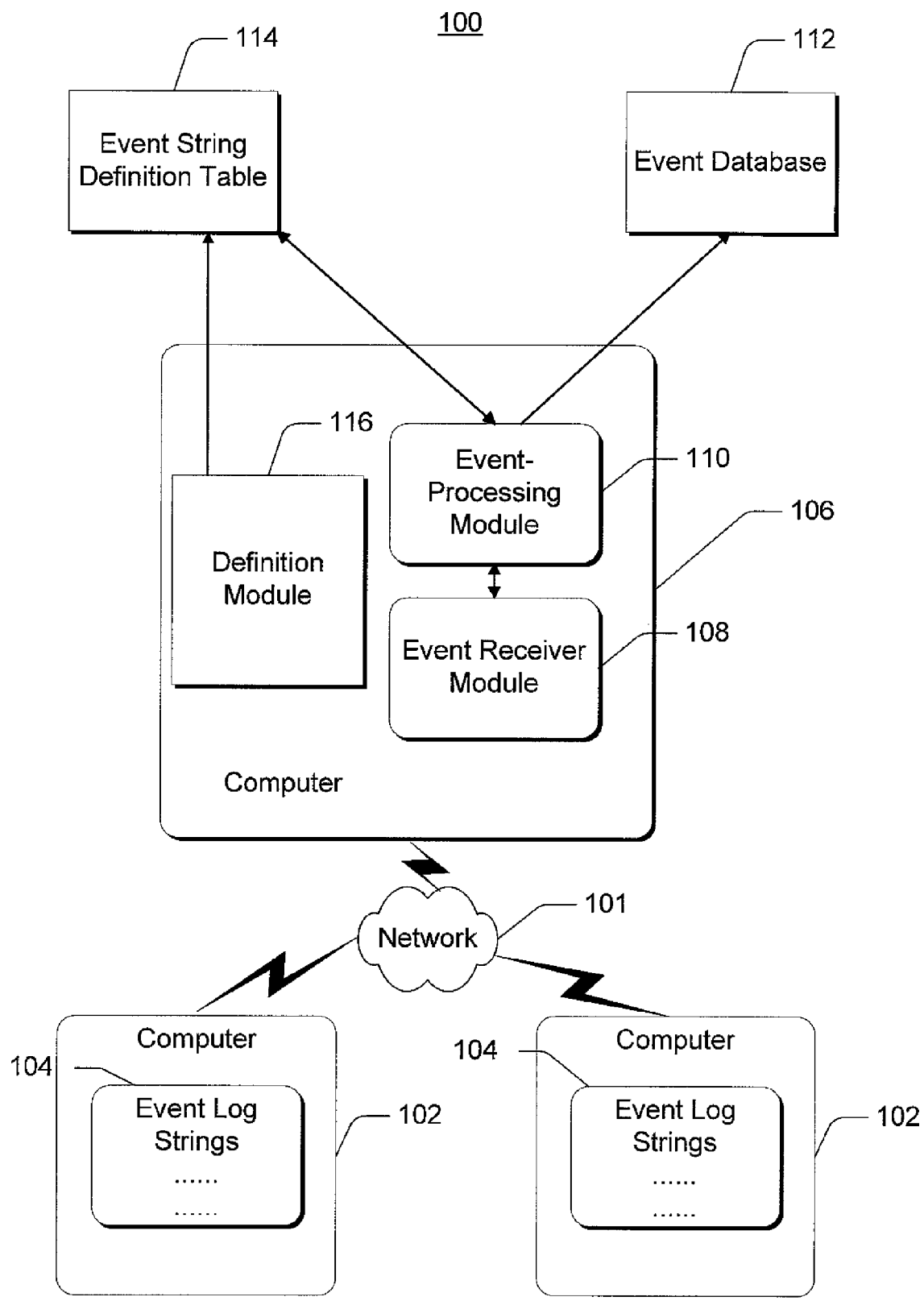
FIG. 1 is a block diagram of a system for storing events to enhance intrusion detection.

FIG. 1 is a block diagram of a system 100 for storing events to enhance intrusion detection. System 100 includes a plurality of computers 102, 106 and a network 101. Although system 100 includes computers 102, 106 for illustration purposes, different numbers of devices and network topologies may be included. Additionally, some of the data structures (to be described) as well as modules shown in system 100 can be implemented within a computing device, such as computer 106, or can be distributed within a computing system having more than one computing device. See the description of "Exemplary Computing System and Environment" below for specific examples and implementations of networks, computing systems, computing devices, and components that can be used to implement the described implementations, including computers 102, 106 and network 101.

Network 101 can be any type of network, such as a local area network (LAN) or a wide area network (WAN), using any type of network topology and any network communication protocol. Furthermore, network 101 can represent a combination of two or more networks. In this example, network 101 includes logical connections to facilitate data communication between the computers 102 and computer 106.

Besides computers 102, 106, system 100 includes two data structures in the form of an event database 112 and an event definition table 114. The two data structures may be stored locally with computer 106 or in any other accessible location such as mass storage for system 100. In the described implementation, the databases are a SQL database, but other types of databases could easily be employed.

Computers 102 operate under the control of a Microsoft® Windows® brand operating system. Nevertheless, other operating systems can be used. Computers 102 contain security event logs 104 which are data files that contain a record of events performed by their respective computer 102. The Microsoft® Windows® operating system normally maintains the record of events, which are generally associated with security sensitive events relating to intrusion detection. Examples of a security sensitive event includes, but is not limited to, logging-on to a network, gaining access to a particular file, performing certain application level tasks that are considered sensitive, gaining access to a particular object, administering passwords, changing passwords, sending and/or receiving a file infected with a virus, and other related events.

Each event is generally recorded in the event log 104. Although different events might contain similar types of data, the format of the data is allowed to vary significantly from one event to another. An "event" is information generated by an operating system or related system when a security sensitive event is performed by a client (user via a client computer). The information contains actual data that identifies users or objects affected by the event. The actual data consists of two sections: a header and data section.

The "header section" is a fixed length section of the event and has several fields, including: an event type (success/failure), event source, event category, event identification, date, time, user name and computer name (see FIG. 1A).

The "data section" is a variable length section of the event that is stored as set of strings. The number of strings present varies according to the "event identification" in the Event Header Section. For example, event 0x272(==626 decimal) contains six strings: foo, KUMARPDOM, KUMARPDOM\foo, Administrator, KUMARPDOM, (0x0, 0x237CE5) (see FIG. 1A).

The "event identification" (also referred to as event ID) identifies the type of event.

Figures 2, 4:
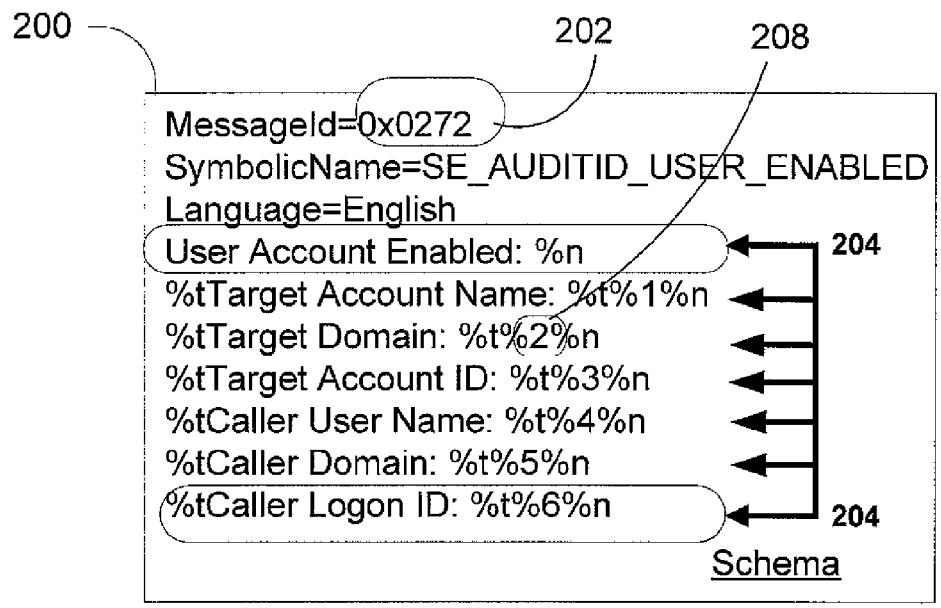
FIG. 2 illustrates an event schema for a particular event.
FIG. 4 shows an exemplary definition table.

"Event Schema" defines how an event is formatted when it is displayed to a user (see FIG. 2 for an example of an event schema for event ID 0x272).

"Field" (or event field) means one of the strings in the data section of an event.

As an example, the following is a single schema that describes an "SE AUDITID USER ENABLED" type of event:

```
MessageId=0x0272
    SymbolicName=SE_AUDITID_USER_ENABLED
    Language=English
User Account Enabled:%n
%tTarget Account Name:%t%1%n
%tTarget Domain:%t%2%n
%tTarget Account ID:%t%3%n
%tCaller User Name:%t%4%n
%tCaller Domain:%t%5%n
%tCaller Logon ID:%t%6%n
```

FIG. 1A illustrates a representative example of a single security sensitive event formatted to make it readable by a human, but stored in the event log.

The header in this example includes the following text:

```
MessageId=0x0272
    SymbolicName=SE_AUDITID_USER_ENABLED
    Language=English
```

In this example, the value "0x0272" is the event identification (the 0x prefix indicates the number is in hexadecimal format). Generally, the event identification follows the header text "MessageId=", regardless of the event type. Other formats could of course be used in other systems. In general, the event identification will comprise code, text or an identification number, at a consistent or identifiable location within the event, that identify the particular type of event and corresponding security sensitive event.

Following the header information, the event also includes a sequence of one or more event descriptors. In this example, each of the lines following the header is an event descriptor. Each descriptor provides different information about an event, such as the account name of a client computer, a password, target account, and so forth.

In this example, each event descriptor comprises a descriptive phrase followed by a value. For example, the first descriptor in the above example contains the descriptive phrase "Target Account Name:", followed by a value. The values of the multiple descriptors can be in the form of numbers, text, or other information. They provide actual information about the event that corresponds to the event. Generally, the initial descriptive phrase describes the nature of the value that follows. For instance, if the descriptive phrase of the event descriptor is "logon ID," then the value that follows the descriptive phrase corresponds to the actual alphanumeric logon ID that was used in conjunction with the event corresponding to the event. As another example, if the descriptive phrase of the event descriptor is "target account" then the value that follows the descriptive phrase indicates the actual alphanumeric target account number used in conjunction with the event corresponding to the event.

As can be seen in the example of FIG. 1A, each event is normally stored as a header followed by a concatenation of event descriptors.

Although the descriptive phrases are meaningful to a human user, they are difficult to analyze in a computer-automated process. One significant reason for this difficulty is that different types of events use different descriptive phrases to describe the same types of values. Generally, the descriptive phrases are generated by different teams of software designers working on different application programs. Thus, although similar information might be provided in different types of events, the information might be preceded by very different descriptive phrases. Furthermore, the ordering of information within the events is not consistent between events of different types.

Event Definition File

An event definition table 114 is generated and maintained in order to allow intelligent parsing of events. Generally, the event definition table contains a record corresponding to each possible event type, and indicates the type of information found at each value location in an event of a particular event type. More specifically, the event definition table contains columns corresponding to value types that might be of particular interest when attempting to detect or trace security breaches. As an example, the Primary User (PU), the Primary Domain (PD), Primary Login (PL) Target User (TU), Target Domain (TD), etc. are all examples of some value types that might be of particular interest.

Event definition table 114 can be generated in a variety of ways. For example, it can be compiled manually, by an analyst who examines the various different types of events and notes the locations of values in the event fields within those strings. In the Windows® brand operating system environment, there are available templates that describe the data formats of different events. For example, such a template for event type 0x272 (discussed above) might appear as follows:

```
MessageId=0x0272
    SymbolicName=SE_AUDITID_USER_ENABLED
    Language=English
User Account Enabled:%n
%tTarget Account Name:%t%1%n
```

-continued

```
%tTarget Domain:%t%2%n
%tTarget Account ID:%t%3%n
%tCaller User Name:%t%4%n
%tCaller Domain:%t%5%n
%tCaller Logon ID:%t%6%n
```

In a template such as this, the "% t" indicates a tab character. Each descriptive phrase is followed by a "% x" placeholder, where x is a numeric integer. Each "% x" placeholder represents a location within the event at which an event field will eventually be located. A "% n" symbol indicates a new line indicator.

Based on the availability of templates such as these, it is also possible to automate the process of creating event definition table 114. FIG. 1 shows a definition module 116 that is designed to automate this process. Generally, definition module 116 works by examining the descriptive phrases of the templates and determining value types from such descriptive phrases.

Accordingly, computer 106 contains a definition-module 116 that generates an event definition table 114. The event definition table 114 provides a map for locating where particular values in the event fields are located within event descriptions of a particular event. Although computer 106 is shown to contain the definition-module 116, the module 116 can actually reside in any computer device.

Once the event definition table 114 is constructed, computer 106 can store events collected from computers 102 in the event database 112. To accomplish this, computer 106 includes an event receiver module 108 that receives the events from the computers 102. That is, the event receiver module 108 collects the various events described in FIG. 1A. The events may be collected periodically or after the occurrence of an event.

Computer 106 also includes an event-processing module 110. After the events are received, the event-processing module 110 identifies values in the event fields within an event description. The event-processing module 110 references the event definition table 114 to determine locations of the values in the event fields. Once the locations are determined, the actual values in the event fields can be stored in fields of the event database 112 that correspond to value types indicated by the event definition table 114.

In other words, the event definition table 114 provides a map of where values in the event fields are located within events and enables the values in the event fields to be stored in fields corresponding to a particular event type. This permits event database 112 to be later searched during intrusion detection for a particular event field by selecting the event type that corresponds to the field in the event database 112 in which the event field is located. This system greatly increases the efficiency of a search for a specific data (event field) during intrusion detection.

Generation of Event Definition File

FIG. 2 illustrates an event schema for a particular event. Event schema 200 includes an event identification 202, event descriptions 204, and values in the event fields 306. An event identification is an event identification value that identifies the type of an event. The event indicator (shown as 202) is 0x272, which in this example refers to event (SE_AUDITI-D_USER_ENABLED). Event descriptions 204 are essentially the components of an event that are shown as separate lines in the event schema 200. Each event description 204 in the event schema provide the definition what the values in the event fields 206 pertain to. For instance, the event descriptions 204 are "User Account Name," "Target Account Name," "Target Domain" and so forth. The values in the event fields 206 provide actual information about the event descriptions, such as what values are associated with of the User Account Name, Target Account Name, Target Account and so forth. The event field may be numeric, alphanumeric and/or in some other description format.

Figure 3:
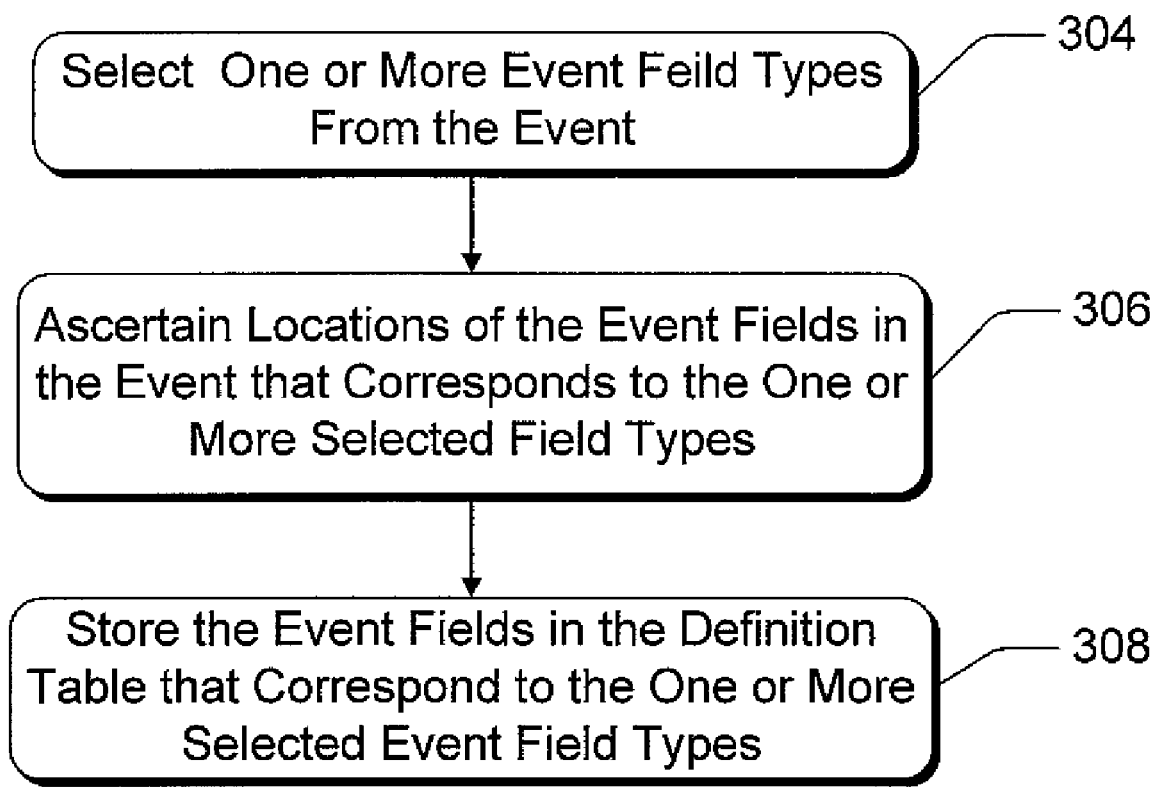
FIG. 3 is a process for generating a definition table.

FIG. 3 is a process 300 for generating a definition table 114. FIG. 3 is a process 300 for generating event definition table 114 by parsing the event schema, such as 200 shown in FIG. 2. In one implementation, process 300 parses an audit event schema definition file, such as the Audite.mc and maps the locations of various component values into a definition table 114. Process 300 includes operational steps 304-310 that are performed by definition-module 116. The order in which process 300 is described is not intended to be construed as a limitation. It is possible for some of the operational steps to be performed in different orders than described in process 300. In the exemplary implementation, definition-module 116 implements process 300 through software. Nevertheless, process 300 can be implemented in any suitable hardware, software, firmware, or combination thereof.

In step 304, once event identifications such as 0x272 are selected, the definition-module 116 selects one or more value types from the events. Value types are categories of the types of security entities within events that provide meaningful information about a security event. As described above, examples of value types include, but are not limited to: a Primary User (PU), a Primary Domain (PD), a Primary Logon (PL), a Target User (TU), a Target Domain (TD), a Target Account ID (TA), a Caller User (CU), Caller Domain (CD), a Caller Logon ID (CL) and other related value types that may be selected from the definition file.

The value types are then placed as placeholders in the definition table 114. In other words, the value types are used as reference fields in table 114, which in the exemplary implementation are columns of the table. FIG. 4 shows an exemplary definition table 114 with value types 402 positioned as reference fields in table 114.

Next, in step 306, the definition-module 116 parses each event corresponding its the event indicator 202, and ascertains locations of values in the event fields in the particular event that corresponds to one or more selected value types. Referring to FIGS. 2 and 4, the definition-module 116 parses the first event description, "Language=English" and ignores the description because it is not one of the selected value types.

Next, in step 308, the definition-module 116 stores the location of the values in the event fields 308 in the table 114. For example, for "Target Account Name" the event field location is %1. So, the definition module 116 inserts an event field of %1 in the TU field 402 of table 114; a %2 in the TD field, a %3 in the TA field and so forth. In value type fields 402 Primary User (PU), Primary Domain (PD), and Primary Logon (PL), the definition-module 116 inserts zeros as defaults, because no event descriptions or values in the event fields correspond to these value types in the example of event type 0x272 shown in FIG. 2. Notice that the event identification 0x272 serves as a row identifier for the values in the event fields associated with that event identification.

Generation of Event Database 112

Once the locations for the values in the event fields are stored in the event definition table 114 for the events selected of interest, the event-processing module 110 is able to use the definition table 114 as a reference to parse actual values in the event fields located in events as the events are collected by computer 106. The event-processing module 110 can then store the values in the event fields in the event database 112 in fields corresponding to the value types indicated by the event definition table 114.

Figure 5:
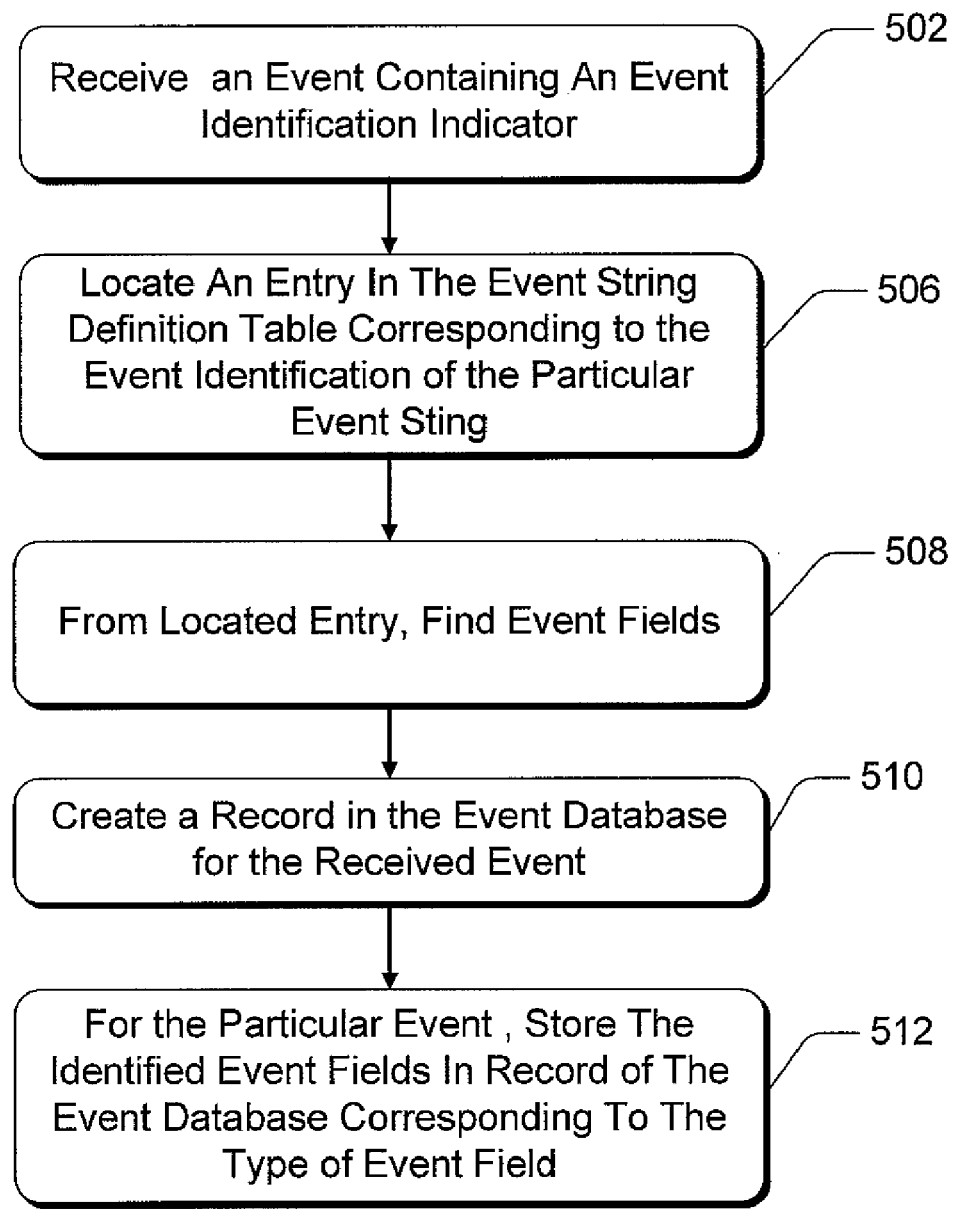
FIG. 5 is a flow chart illustrating a process for storing event fields in the event database.

FIG. 5 is a flow chart illustrating a process 500 for storing values in the event fields in the event database 112. Process 500 includes steps 502 through 512. The order in which process 500 is described is not intended to be construed as a limitation. It is possible for some of the operational steps to be performed in different orders than described in process 500. In the exemplary implementation, event-receiver module 108 and event-processing module 110 implement process 500 through software. Nevertheless, process 500 can be implemented in any suitable hardware, software, firmware, or combination thereof.

In step 502, event receiver module 108 receives an event containing an event identification and event descriptions. For example, referring to FIG. 1A, the event contains event identification and event descriptions. The event-processing module 110 then identifies values in the event fields.

In step 506, once the values in the event fields are located, the event-processing module 110 locates an entry in the event definition table 114 that corresponds to the event identification of the particular event. Knowing the event identification from the received event, permits the event processing module 110 to refer to event definition table 114 by locating a matching event identification from the table 114. For example, the event identification in FIG. 1A is 0x272, so the event processing module 110 is able to locate event identification in table 114 shown in FIG. 4.

Next, in step 508, the event-processing module 110 locates value types referenced from the table 114 that correspond to the values in the event fields of the received event. By referencing table 114 in FIG. 4, for instance, value type Caller Logon ID (CL) indicates that event field event identification 0x272 is %6. Accordingly, the event-processing units know that the event field from the %6 position is a CL type of event field.

Figure 6:
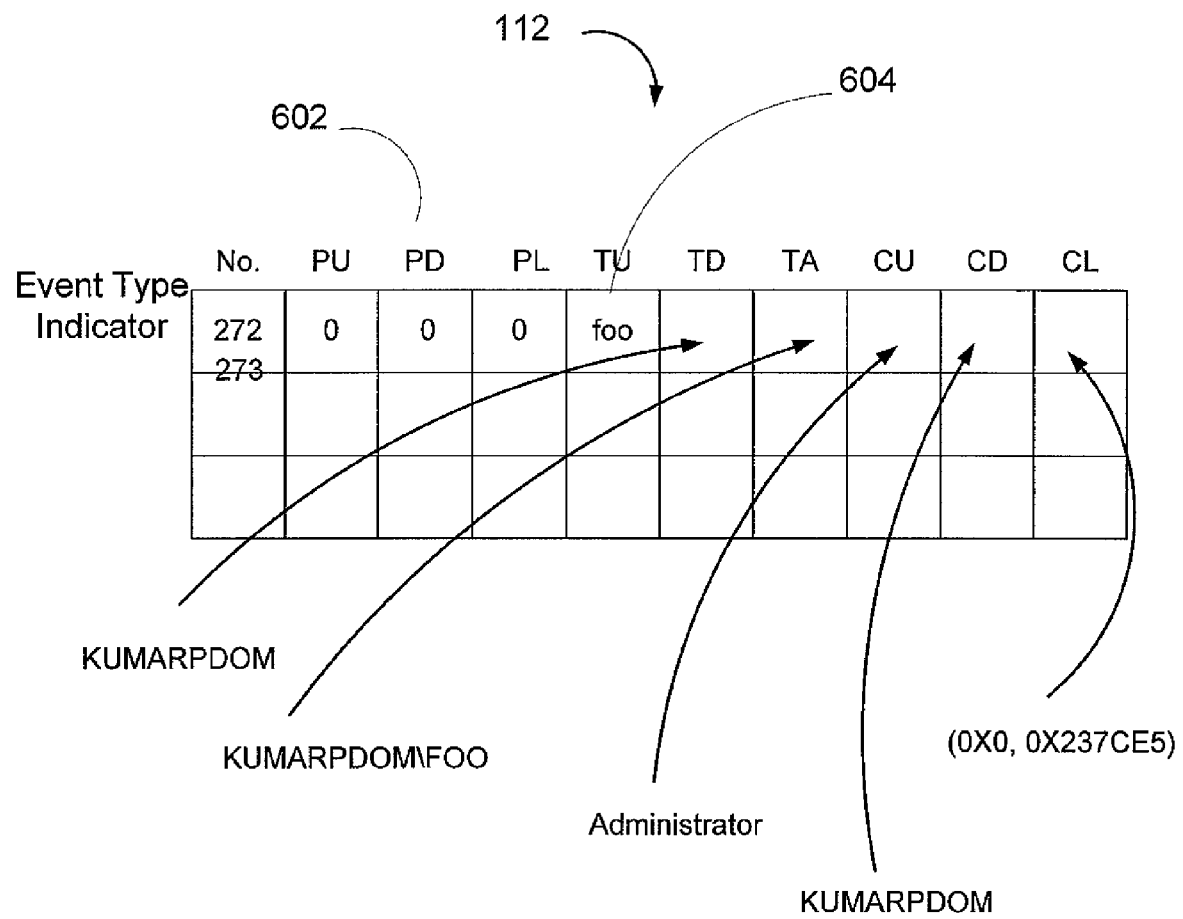
FIG. 6 shows an exemplary event database record for the particular event shown in FIG. 1A.

In step 510, the event processing module 110 creates a record in the event database 112 for each received event. FIG. 6 shows, an exemplary recorded table for event type indicator 0x272 from the event shown in FIG. 1A.

In step 512, the event processing module 110 completes the record for each particular event. Event processing module 10 stores the identified values in the event fields in fields of the event database 112 that correspond to the value types referenced from table 114 of the values in the event fields. For example, for the Caller Logon ID (CL) value type field, the event-processing module stores the event field (0X0, 0X237CE5), which is the actual value for the event field for the Caller Logon ID received with this event.

Exemplary Computing System and Environment

Figure 7:
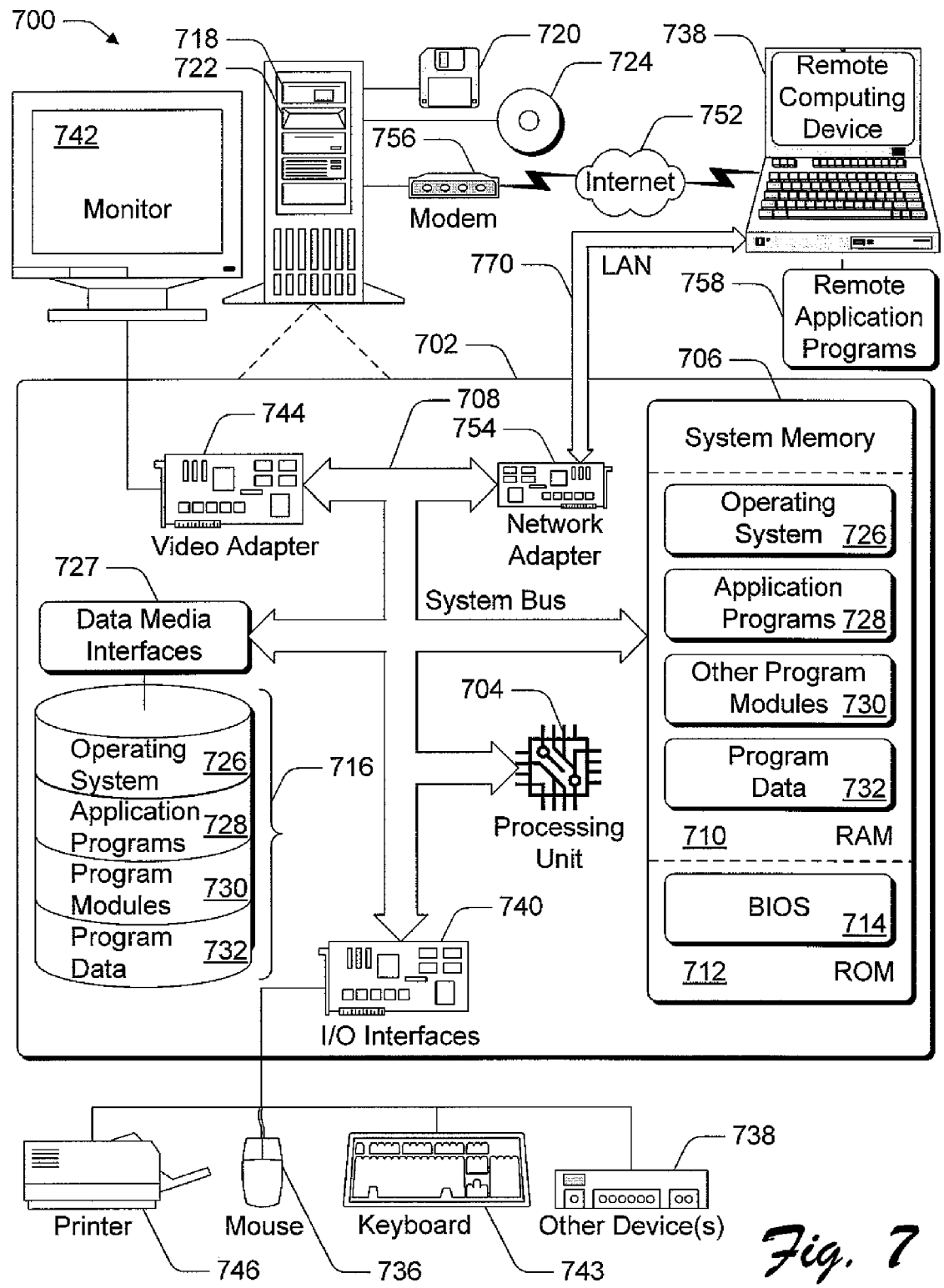
FIG. 7 illustrates an example of a computing environment within which the computer, network, and system architectures described herein can be either fully or partially implemented.

FIG. 7 illustrates an example of a computing environment 700 within which the computer, network, and system architectures described herein can be either fully or partially implemented. Exemplary computing environment 700 is only one example of a computing system and is not intended to suggest any limitation as to the scope of use or functionality of the network architectures. Neither should the computing environment 700 be interpreted as having any dependency or requirement relating to any one or combination of components illustrated in the exemplary computing environment 700.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

Modules 108, 110 and 116 may be described in the general context of computer-executable instructions, such as program modules, being executed by a computer. Generally, program modules include routines, programs, objects, components, data structures, etc. that perform particular tasks or implement particular abstract data types. Modules 108, 110 and 116 may also be practiced in distributed computing environments where tasks are performed by remote processing devices that are linked through a communications network. In a distributed computing environment, program modules may be located in both local and remote computer storage media including memory storage devices.

The computing environment 700 includes a general-purpose computing system in the form of a computer 702. The components of computer 702 can include, by are not limited to, one or more processors or processing units 704, a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 702 typically includes a variety of computer readable media. Such media can be any available media that is accessible by computer 502 and includes both volatile and non-volatile media, removable and non-removable media. The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 can also include other removable/non-removable, volatile/non-volatile computer storage media. By way of example, FIG. 7 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternatively, the hard disk drive 716, magnetic disk drive 718, and optical disk drive 722 can be connected to the system bus 708 by a SCSI interface (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may include an embodiment of modules 108, 110 and 116 and table 114 and database 112.

Computer system 702 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 540 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device 748. By way of example, the remote computing device 748 can be a personal computer, portable computer, a server, a router, a network computer, a peer device or other common network node, and the like. The remote computing device 748 is illustrated as a portable computer that can include many or all of the elements and features described herein relative to computer system 702.

Logical connections between computer 702 and the remote computer 548 are depicted as a local area network (LAN) 750 and a general wide area network (WAN) 752. Such networking environments are commonplace in offices, enterprise-wide computer networks, intranets, and the Internet. When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components, such as the operating system, are illustrated herein as discrete blocks, although it is recognized that such programs and components reside at various times in different storage components of the computer system 702, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method for maintaining records of events in a system, the method comprising:
   generating, by a definition-module, an event definition table by:
      selecting one or more value types of event fields from an event schema and placing the one or more value types as one or more placeholders in the event definition table;
      parsing the event schema by a corresponding event identification indicator to ascertain locations of the one or more value types of the event fields in the event schema; and
      storing, in the definition table, the locations of the one or more value types of the event fields;
   receiving, by an event receiver module, an event that contains, respectively, an event identification indicator and strings containing event fields each specifying a different component aspect of the event; and
   referencing, by an event-processing module, the event definition table to determine locations of the event fields in the event;
   parsing, by the event-processing module, one or more actual values of the event fields in the event received, wherein the event definition table is utilized as a reference for the parsing; and
   storing, by the event-processing module, the actual values of the event fields in a record of a database according to the different component aspects specified by the event fields.

2. The method as recited in claim 1, wherein the event pertains to a security sensitive transaction.

3. The method as recited in claim 1, wherein one or more of the event fields pertain to a client logging-on to a network.

4. The method as recited in claim 1, wherein one or more of the event fields pertain to a client opening a file.

5. The method as recited in claim 1, wherein one or more of the event fields pertain to a client performing certain application level tasks.

6. The method as recited in claim 1, wherein one or more of the event fields pertain to a client administering passwords.

7. The method as recited in claim 1, wherein one or more of the event fields pertain to a client changing passwords.

8. The method as recited in claim 1, wherein one or more of the event fields pertain to a client accessing a particular object.

9. A system comprising:
one or more processors;
memory communicably couple to the one or more processors;
an event receiver module maintained in the memory and executed on the one or more processors that receives an event that contains, respectively, an event identification indicator and strings containing event fields each specifying a different component aspect of the event; and
an event-processing module maintained in the memory and executed on the one or more processors that receives an event that
references an event definition table to determine locations of the event fields in the event, the event definition table, generated by a definition-module by:
selecting one or more value types of event fields from an event schema and placing the one or more value types as one or more placeholders in the event definition table;
parsing the event schema by a corresponding event identification indicator to ascertain locations of the one or more value types of the event fields in the event schema; and
storing, in the definition table, the locations of the one or more value types of the event fields;
parses one or more actual values of the event fields in the event received, wherein the event definition table is utilized as a reference for the parsing; and
stores the actual values of the event fields in a record of a database according to the different component aspects specified by the event fields.

10. The system as recited in claim 9, wherein the event pertains to a security sensitive transaction.

11. The system as recited in claim 9, wherein one or more of the event fields pertain to a client logging-on to a network.

12. The system as recited in claim 9, wherein one or more of the event fields pertain to a client opening a file.

13. The system as recited in claim 9, wherein one or more of the event fields pertain to a client performing certain application level tasks.

14. The system as recited in claim 9, wherein one or more of the event fields pertain to a client administering passwords.

15. The system as recited in claim 9, wherein one or more of the event fields pertain to a client changing passwords.

16. The system as recited in claim 9, wherein one or more of the event fields pertain to a client accessing a particular object.

17. One or more computer-readable storage media comprising computer-executable instructions that, when executed, direct a computing system to:
receive an event that contains, respectively, an event identification indicator and strings containing event fields each specifying a different component aspect of the event; and
reference an event definition table, the event definition table to determine locations of the event fields in the event, the event definition table generated by:
selecting one or more value types of event fields from an event schema and placing the one or more value types as one or more placeholders in the event definition table;
parsing the event schema by a corresponding event identification indicator to ascertain locations of the one or more value types of the event fields in the event schema; and
storing, in the definition table, the locations of the one or more value types of the event fields;
parse one or more actual values of the event fields in the event received, wherein the event definition table is utilized as a reference for the parsing; and
store the actual values of the event fields in a record of a database according to the different component aspects specified by the event fields.

18. The one or more computer-readable storage media as recited in claim 17, wherein the event pertains to a security sensitive transaction.

19. The one or more computer-readable storage media as recited in claim 9, wherein one or more of the event fields pertain to one or more of
a client logging-on to a network;
a client opening a file;
a client performing certain application level tasks;
a client administering passwords;
a client changing passwords; and
a client accessing a particular object.

* * * * *